United States Patent
Gresko

(10) Patent No.: US 7,344,641 B2
(45) Date of Patent: Mar. 18, 2008

(54) USED WATER TREATMENT SYSTEM FOR RESIDENCES AND THE LIKE

(75) Inventor: Edward Gresko, St. Colomban (CA)

(73) Assignee: Société Systèmes Ecobox, St-Lambert, Quebec (CA)

( * ) Notice: Subject to any disclaimer, the term of this patent is extended or adjusted under 35 U.S.C. 154(b) by 490 days.

(21) Appl. No.: 10/942,596

(22) Filed: Sep. 16, 2004

(65) Prior Publication Data

US 2005/0061736 A1   Mar. 24, 2005

(30) Foreign Application Priority Data

Sep. 19, 2003   (CA) ................... 2441725

(51) Int. Cl.
 *B01D 21/02* (2006.01)
 *B01D 21/26* (2006.01)
 *C02F 1/00* (2006.01)
 *C02F 1/38* (2006.01)

(52) U.S. Cl. ............... 210/170.08; 210/259; 210/262; 210/295; 210/299; 210/304; 210/512.1; 210/512.2; 210/532.2

(58) Field of Classification Search ........... 210/170.08, 210/259, 295, 299, 304, 512.1, 512.2, 532, 210/532.2, 262
See application file for complete search history.

(56) References Cited

U.S. PATENT DOCUMENTS 5,707,513 A * 1/1998 Jowett et al. ........... 210/170.08
6,533,946 B2 * 3/2003 Pullman ..................... 210/259
6,641,721 B2 * 11/2003 Mullerheim ................ 210/259

* cited by examiner

*Primary Examiner*—David A Reifsnyder
(74) *Attorney, Agent, or Firm*—Eric Fincham

(57) ABSTRACT

A system for the treatment of residential wastewater which comprises a septic tank, a holding tank in fluid communication with the septic tank and a reactor containing a plurality of media on which the wastewater is sprayed, and cyclonic clarification means. The system is designed to treat the wastewater such that it does not need to be passed to a drainage field for final disposal.

10 Claims, 6 Drawing Sheets

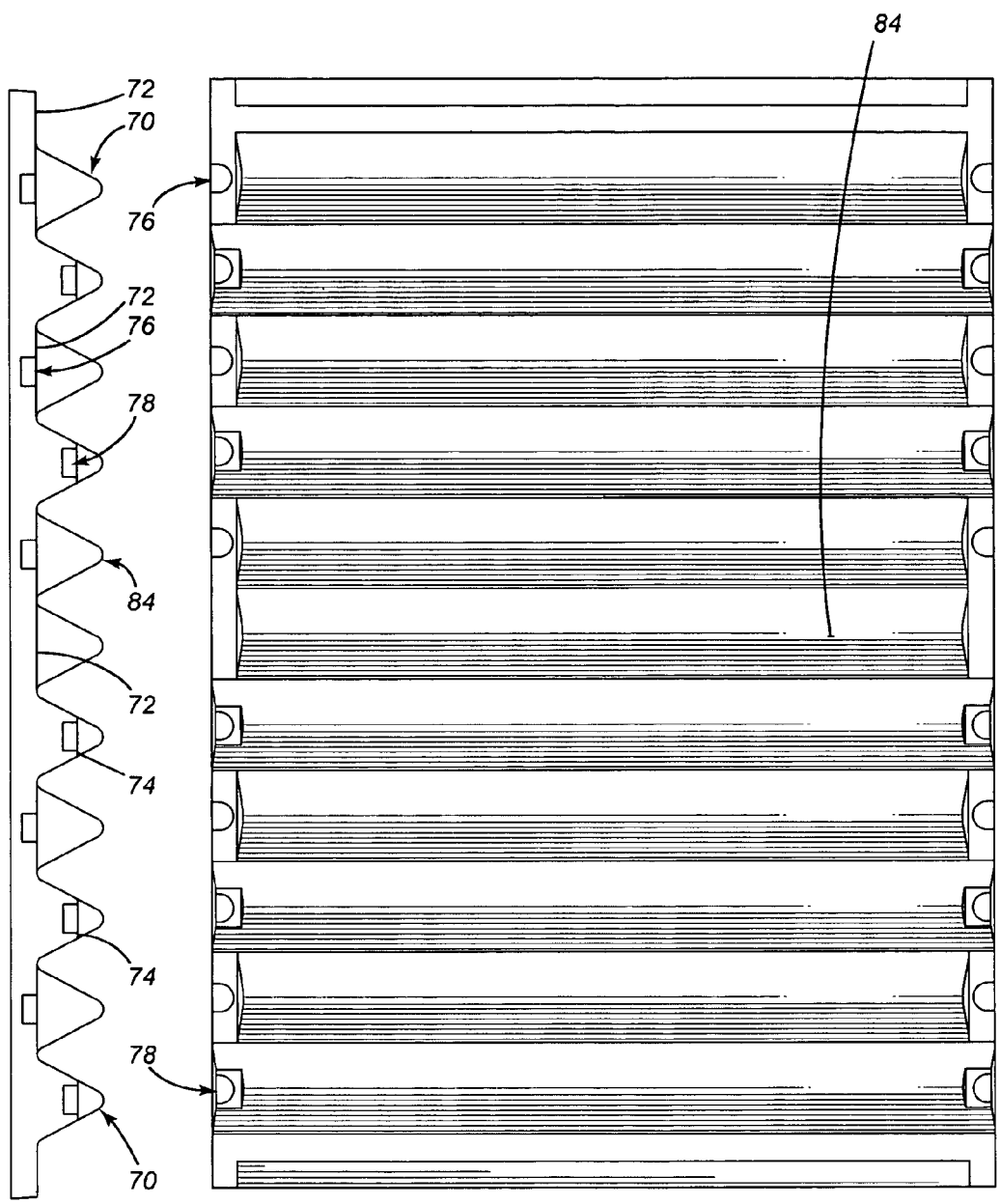
*Fig-6*  *Fig-7*
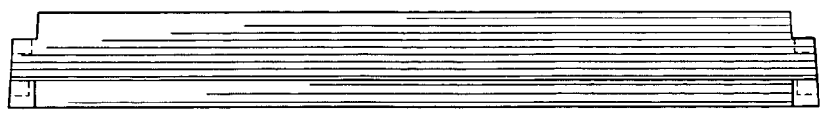
*Fig-8*

USED WATER TREATMENT SYSTEM FOR RESIDENCES AND THE LIKE

FIELD OF THE INVENTION

The present invention relates to a method and system for the treatment of used or wastewater and more particularly, relates to a method and system for treatment of relatively small quantities of used water such as in a residence or other small application.

BACKGROUND OF THE INVENTION

For most residences in an urban environment, the treatment of used water is not a problem since the used or wastewater is forwarded directly to a sewage treatment plant through an appropriate collector system. However, in many rural environments, such options are not available and accordingly, it is incumbent on each residence to provide for a wastewater treatment system.

Typically, a residential wastewater treatment system will comprise a septic tank, usually having two compartments, following which the used water is fed to a drainage field wherein it is allowed to slowly percolate into the soil.

Problems arise when local geographic conditions prevent the use of typical drainage tiles. Thus, many residences are located in areas where it is impossible to dig, due to local geological formations, to provide for the drainage field. In such instances, other solutions have had to be adopted including the use of holding tanks and the like.

SUMMARY OF THE INVENTION

It is an object of the present invention to provide a system suitable for treatment of domestic used water, and which system does not require a drainage field.

It is a further object of the present invention to provide for a method for the treatment of domestic used water, and which method does not require that the water be passed to a drainage field for final disposal.

According to one aspect of the present invention, there is provided a system for the treatment of wastewater comprising a septic tank, a holding tank in fluid communication with the septic tank, a reactor, the reactor containing a plurality of media, means to spray the wastewater on the media, and a cyclonic clarification means.

According to a further aspect to the present invention, there is provided a method for the treatment of residential wastewater comprising sending the wastewater to a septic tank, passing the wastewater from the septic tank to a holding tank, passing the wastewater from the holding tank to a reactor section, spraying the wastewater over a plurality of media in the reactor section, passing the wastewater from the media section to a cyclonic clarification, and disposing of the wastewater in a soil.

According to a still further aspect of the present invention, there is provided a member suitable for use as media in the treatment of wastewater, the member comprising a plurality of first and second V-shaped portions forming a plurality of parallel peaks and valleys, the first and second V-shaped portions terminating in first and second ends, the first V-shaped portions having an upper wall portion located at each of the ends, the second V-shaped portions having a lower wall section at each of the ends, the first and second V-shaped portions being located in a generally alternating configuration, one of the first and second V-shaped portions having a non-alternating configuration with a like V-shaped portion so as to be contiguous.

In a preferred embodiment of the present invention, the media in the reactor section is formed of a plurality of members as set forth above. As it will be described in the preferred embodiments of the present invention, the members are designed to sit on top of one another in a spaced apart relationship when placed in a first position while, when reversed, the members will nest one into the other to provide for compact shipping of the same.

The present invention provides a substantial advantage over known systems in that it uses an indigenous bacteria population to treat the used water, and provides a media which is designed to support and indeed increase the bacteria population. The invention uses a minimum number of components and the only power needed is for pumping the wastewater from one location to another. The maintenance required is minimal and the system can be used both above and below ground.

The system may be provided in different capacities and thus, generally a first system may treat a residence of in between 1 and 3 bedrooms and which would normally have a capacity of treating up to approximately 1,600 liters per day. A second version for larger residences could treat up to double this amount—approximately up to 3,200 liters per day.

The system is designed to treat household waste and accordingly, one should avoid introducing other waste into the system such as any industrial waste or the like. The bacteria will degrade all biodegradable materials and accordingly, materials such as plastic and the like should not be introduced. However, normally such non biodegradable components are maintained in the septic tank which would be emptied on a regular scheduled basis as is the requirement in many communities.

BRIEF DESCRIPTION OF THE DRAWINGS

Having thus generally described the invention, reference will be made to the accompanying drawings illustrating an embodiment thereof, in which:

FIG. 6 is a side elevational view thereof;

FIG. 7 is a top plan view thereof;

FIG. 8 is an end elevational view thereof;

DESCRIPTION OF THE PREFERRED EMBODIMENTS

Figure 1:
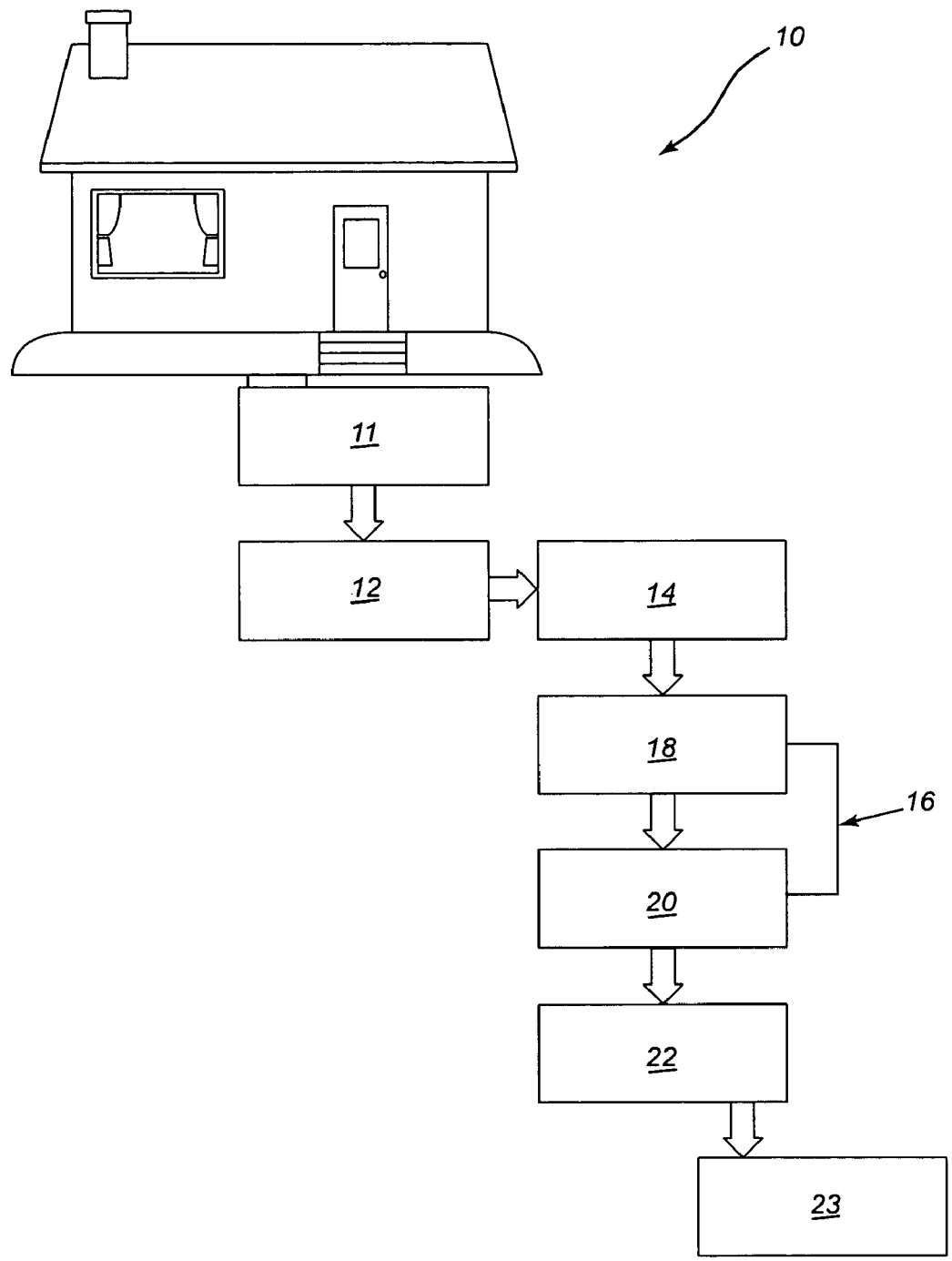
FIG. 1 is a schematic view of an integrated sewage treatment system according the present invention.

Referring to the drawings in a greater detail and by reference characters thereto, there is illustrated in FIG. 1 a novel treatment system suitable for a residence 10 which includes, as shown schematically in FIG. 1 by steps, a collection arrangement 11, a septic tank 12, a holding tank 14, and a final treatment station 16 which includes a reactor 18 having media therein, a cyclonic filtration section 20, and an optional ultra violet treatment 22 followed by a discharge 23.

Figures 2, 3:
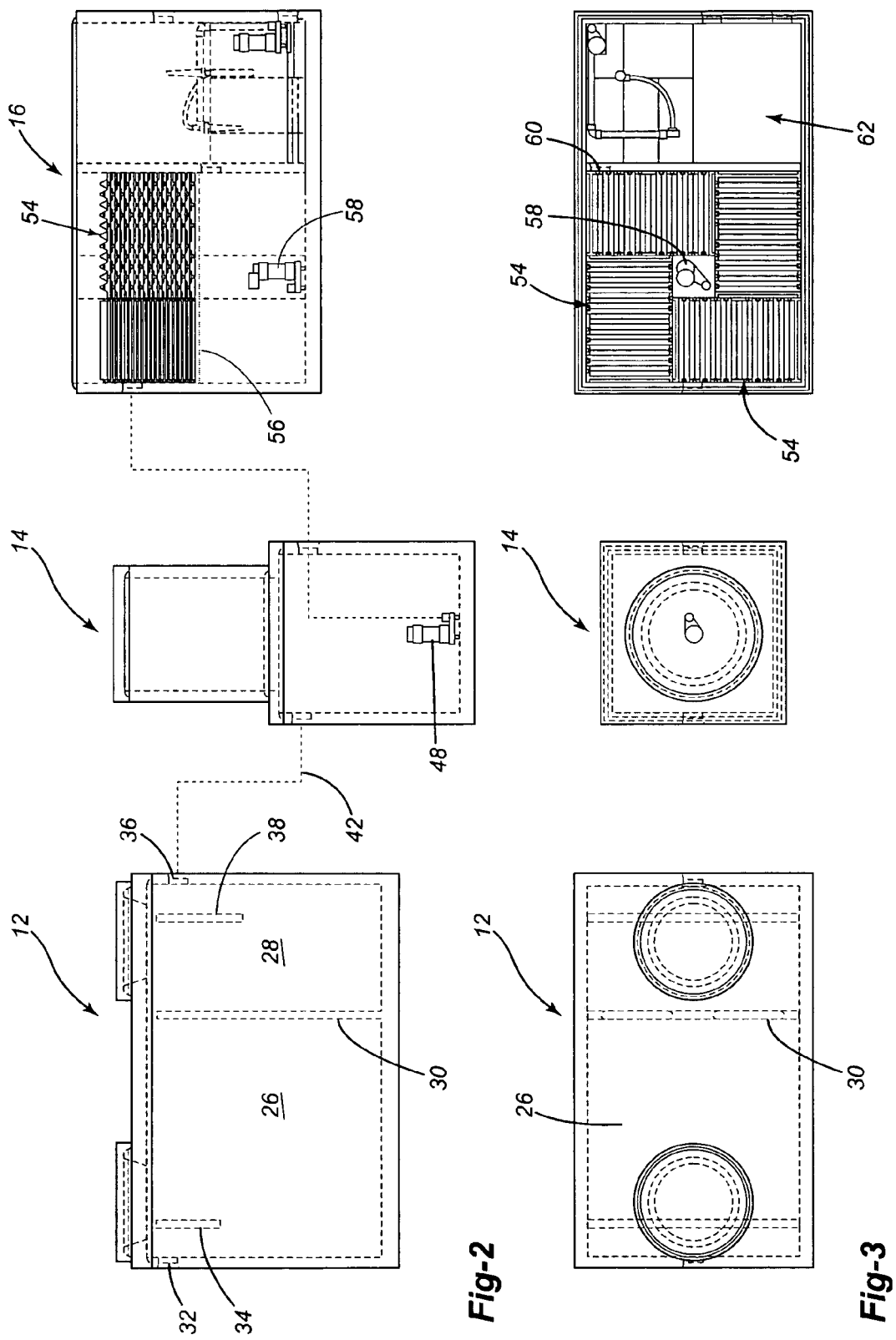
FIG. 2 is a side elevational view, with portions removed, of a sewage treatment system, according to the present invention.
FIG. 3 is a top plan view of various sections thereof.
Figure 4:
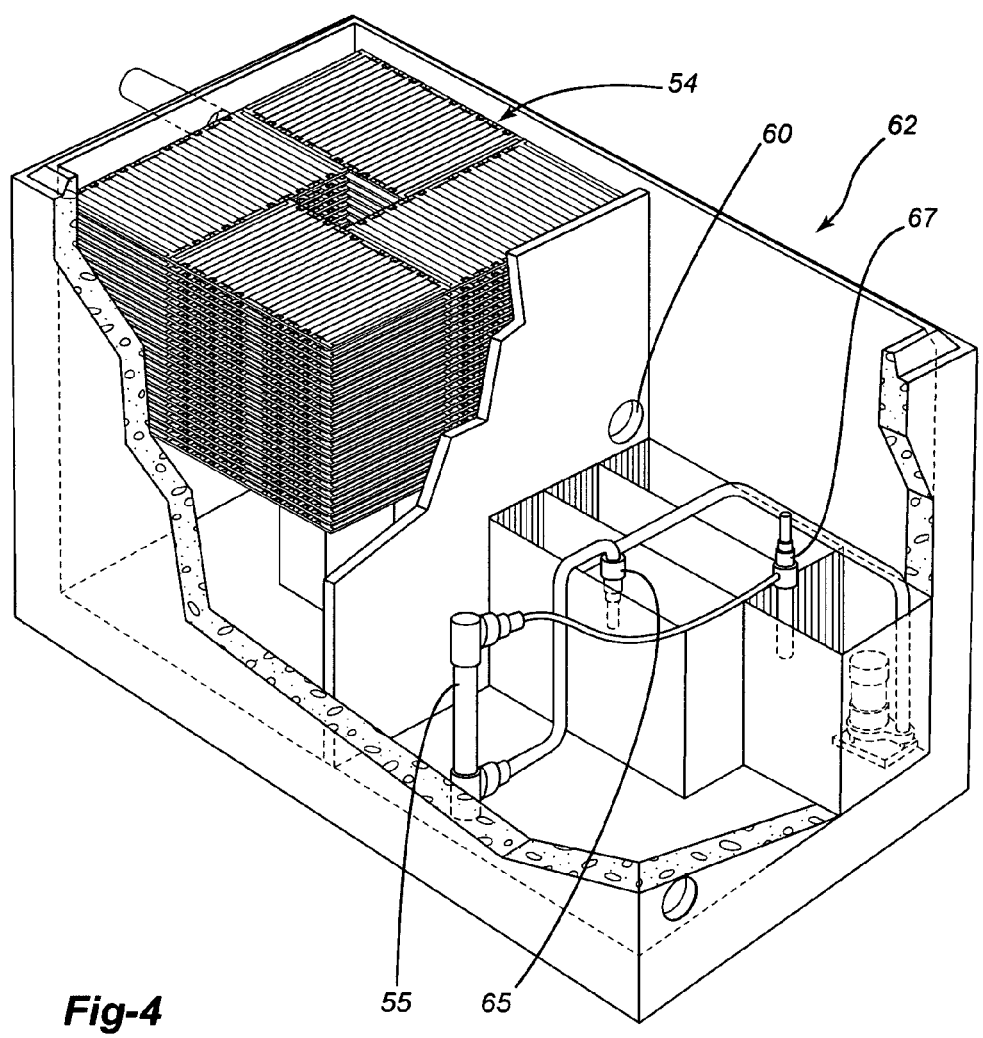
FIG. 4 is a perspective partial cutaway view of the reactor section of the overall system.
Figure 5:
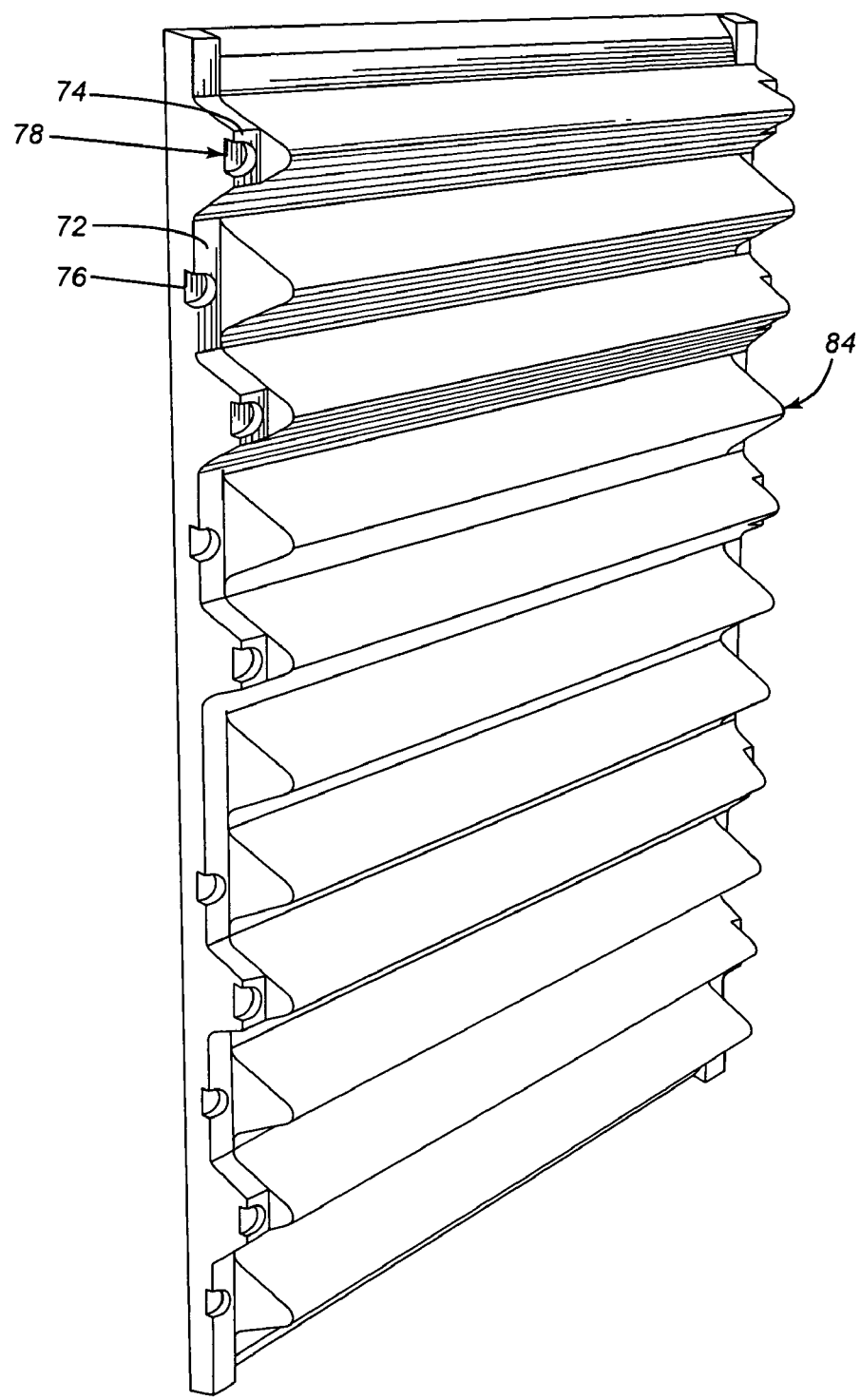
FIG. 5 is a perspective view of one of the media members.
Figure 9:
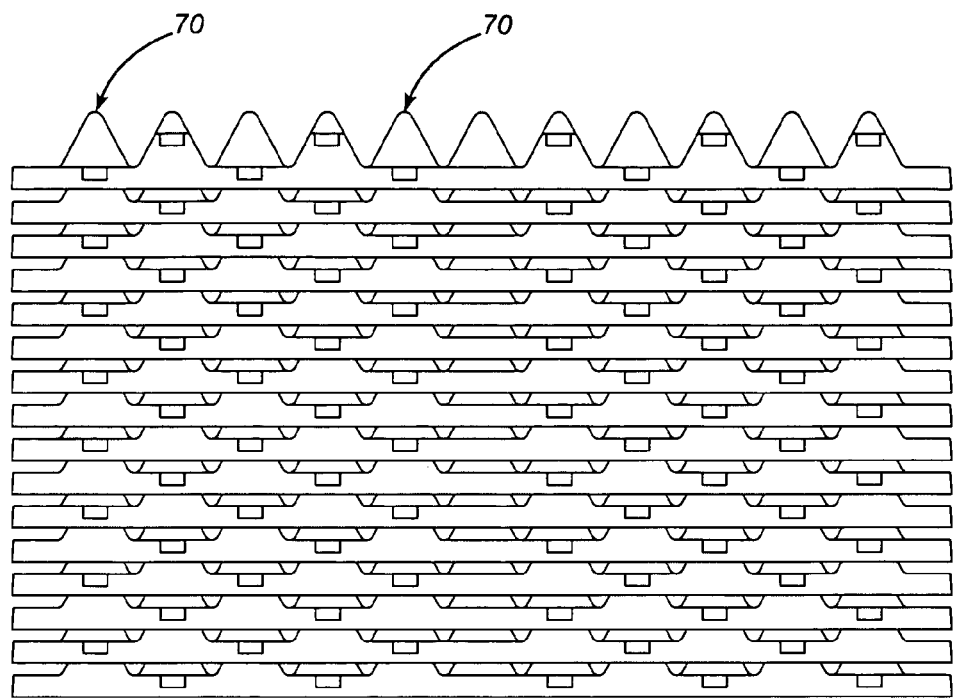
FIG. 9 is a side elevational view of a plurality of the media members in a stacked relationship for use in a system.
Figure 10:
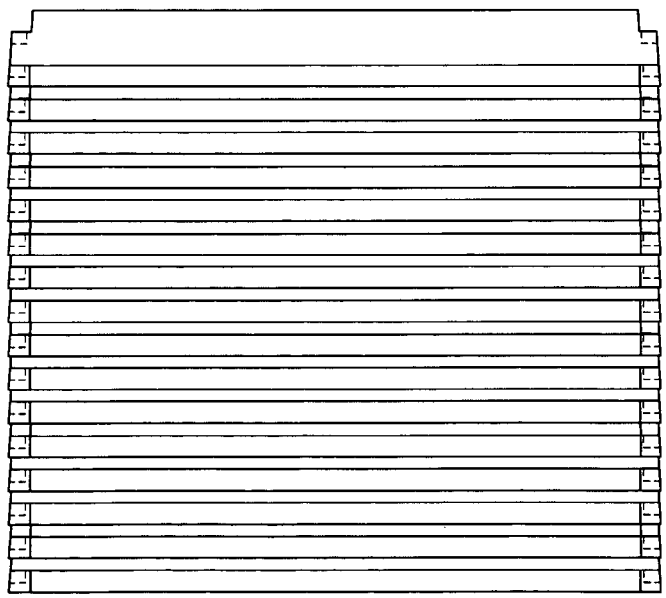
FIG. 10 is an end elevational view of the media members in a stacked storage position.

Referring to FIGS. 2 and 3, it will be seen that septic tank 12, in a conventional manner, includes a first chamber 26 and a second chamber 28 separated by a dividing wall 30, but having a passage therebetween. The first chamber 26 has an inlet 32 to receive wastewater from the residence while mounted adjacent inlet 32 is a deflector 34. In the second chamber 28, there is provided an outlet 36 having a deflector 38 mounted proximate thereto to prevent passage of solid waste.

A conduit 42 extends between septic tank 12 and holding tank 14. Holding tank 14 is designed to act as a buffer and also to retain wastewater therein for continual feed to the final treatment station 16. To this end, there is provided a pump 48 located in the bottom of holding tank 14.

In the final treatment station 16, there is an inlet 52 designed to receive the wastewater from the holding tank 14. In a first section of the final treatment station 16, there is provided a plurality of media 54 which are mounted on a support 56 as will be discussed in greater detail hereinbelow. Situated below media 54 and support 56 is a pump 58 to spray the wastewater from a bottom portion to the top. Subsequently, the wastewater passes through outlet 60 to a second chamber generally designated by reference numeral 62.

As may be seen in the drawings, there are provided at least two hydrocyclones. In this regard, a first hydrocyclone 65 is arranged in a conventional manner wherein the conical portion is situated at the lower extremity. The fluid is fed in through an upper feed inlet wherein a rotational motion is imparted thereto. The acute angle near the bottom causes bridging and plugging wherein the liquid will reverse and flow upwardly along with an air core. The solids will be discharged at the bottom. A second hydrocyclone 67 is arranged in a reverse direction with the conical end being situated upwardly to receive water from the first hydrocyclone 65 thereby permitting addition of air in the water. Optionally an H.V. unit 55 may be used.

As may be seen in FIGS. 6 to 9, a unique feature of the present invention is the specially designed media. Thus, each sheet of media comprises a central "corrugated" portion which is in the form of generally V-shaped portions designated by reference numeral 70. Each V-shaped portion 70 extends substantially across the media and terminates in a staggered configuration. Thus, there are two different types of V-shaped portions 70 in an alternating arrangement. Thus, a first V-shaped configuration will terminate in a lower horizontal wall 72 which is at the level of the trough between the upwardly extending V-shaped portions. Adjacent to this, a neighbouring V-shaped portion terminates in an upper horizontal wall 74 which is slightly below the peak of the V-shaped portion. Lower horizontal wall portion 72 is provided with a lower wall recess 76 which forms a downwardly extending projection 77, while upper wall 74 is provided with an upper wall recess 78 which also forms a projection 79. Both lower horizontal wall 72 and upper horizontal wall 74 terminate at a downwardly extending side wall 80.

In this arrangement, there is provided one centrally located V-shaped portion 84 which does not fit in the alternating pattern. This V-shaped portion 84 has a lower horizontal wall 72 but without any lower wall recesses.

This arrangement permits the media to be coupled together whereby the lower wall recesses 76 fit within one another to keep the first media layer spaced from a second media layer while maintaining a semi rigid structure.

However, for shipping purposes, one media layer may be reversed and in this arrangement, the upper wall recesses and projections 78 fit within each other. This arrangement provides for a compact storage position wherein one layer will lie substantially adjacent adjoining layers. Utilizing this arrangement provides for ease of shipping of the media minimizing the amount of space required.

A system configured as above was utilized in a residence and the results are as follows.

EXAMPLE 1

| Date | Parameters | Outflow Septic tank | Outflow Ecobox |
|---|---|---|---|
| Week 1 | $BOD_5$ C (mg/L) | 168 | <6 |
|  | SS (mg/L) | 30 | <3 |
|  | $NH_4$ (mg/L) | 38.9 | 0.05 |
|  | Fecal Coliforms (UFC/100 ml) | TNC* | 250 |
| Week 3 | $BOD_5$ C (mg/L) | 150 | <6 |
|  | SS (mg/L) | 32.3 | <3 |
|  | $NH_4$ (mg/L) | 42.8 | 0.06 |
|  | Fecal Coliforms (UFC/100 ml) | 290 000 | 213 |
| Week 5 | $BOD_5$ C (mg/L) | 222 | <6 |
|  | SS (mg/L) | 37.2 | <3 |
|  | $NH_4$ (mg/L) | 45 | 0.05 |
|  | Fecal Coliforms (UFC/100 ml) | 410 000 | 620 |
| Week 6 | $BOD_5$ C (mg/L) | 156 | <6 |
|  | SS (mg/L) | 33.3 | <3 |
|  | $NH_4$ (mg/L) | 38.7 | 0.04 |
|  | Fecal Coliforms (UFC/100 ml) | 485 000 | 220 |
| Week 7 | $BOD_5$ C (mg/L) | 194 | <6 |
|  | SS (mg/L) | 64.35 | <3 |
|  | $NH_4$ (mg/L) | 36.8 | <0.03 |
|  | Fecal Coliforms (UFC/100 ml) | TNC* | 110 |
| Week 8 | $BOD_5$ C (mg/L) | 221 | <6 |
|  | SS (mg/L) | 48.1 | <3 |
|  | $NH_4$ (mg/L) | 46.6 | 0.03 |
|  | Fecal Coliforms (UFC/100 ml) | 306 000 | <10 |
| Average | $BOD_5$ C (mg/L) | 185 | <6 |
|  | SS (mg/L) | 40.9 | <3 |
|  | $NH_4$ (mg/L) | 41.5 | 0.05 |
|  | Fecal Coliforms | 372 750 | 283 |

EXAMPLE 2

Again, a three bedroom residence having four people on a permanent basis was monitored. The daily flow averaged 824 liters per day while the maximum daily flow was 1,605 cubic meters per day. The total media comprised 154 sq. meters which consists of 36 blocks of 18 sheets stacked in two layers, one on top of each other. The wastewater was, after treatment, clean enough to be discharged.

It will be understood that the above described embodiment is for purposes of illustration only and changes and modifications may be made thereto without departing from the spirit and scope of the invention.

I claim:

1. A system for the treatment of wastewater comprising:
   a septic tank;
   a holding tank in fluid communication with said septic tank;
   a reactor, said reactor containing a plurality of media, said media comprising a plurality of corrugated members, means to spray said wastewater on said media; and
   a cyclonic clarification means.

2. The system of claim 1 wherein said cyclonic clarification means comprises a first and second hydrocyclone.

3. The system of claim 2 wherein said first hydrocyclone is oriented with a conical end extending downwardly and said second hydrocyclone is oriented with a conical end extending upwardly.

4. The system of claim 1 further including a housing forming a compartment, said plurality of media being mounted in an upper portion of said compartment, said means to spray said waste water being mounted in a lower portion thereof.

5. The system of claim 1 further including a UV treatment downstream from said cyclonic clarification means.

6. The system of claim 1 further including a housing enclosing said reactor and said cyclonic clarification means, said housing including a divider between said reactor and said cyclonic clarification means, and a fluid passage within said divider.

7. The system of claim 1 wherein said media each comprises a plurality of first and second V-shape portions forming a plurality of parallel peaks and valleys, said first and second V-shape portions terminating in first and second ends, said first V-shape portion having an upper wall portion located at each of said ends, said second V-shape portion having a lower wall portion at each of said ends, said first and second V-shape portions being located in a generally alternating configuration, one of said first and second V-shape portions having a non alternating configuration with a like V-shape portion so as to be contiguous.

8. The system of claim 7 wherein said upper wall portions and said lower wall portions are substantially horizontal with respect to a vertical direction of said V-shape portions.

9. The system of claim 8 wherein said upper wall portions and said lower wall portions have recesses formed on one side thereof.

10. The system of claim 9 wherein an opposite side of said upper and lower wall portions has a projection located thereon, said projection being designed to sit within said recess of an adjacent member.

* * * * *